(12) United States Patent
Horvath et al.

(10) Patent No.: US 7,835,988 B2
(45) Date of Patent: Nov. 16, 2010

(54) METHODS AND APPARATUS FOR PREVENTING FRAUD IN PAYMENT PROCESSING TRANSACTIONS

(75) Inventors: Kris M. Horvath, O'Fallon, MO (US); Maurice David Liscia, Long Island City, NY (US); Jean-Louis Rouquet, Glabais (BE)

(73) Assignee: Mastercard International, Inc., Purchase, NY (US)

( * ) Notice: Subject to any disclaimer, the term of this patent is extended or adjusted under 35 U.S.C. 154(b) by 3 days.

(21) Appl. No.: 11/952,334

(22) Filed: Dec. 7, 2007

(65) Prior Publication Data

US 2008/0306850 A1    Dec. 11, 2008

Related U.S. Application Data

(60) Provisional application No. 60/942,073, filed on Jun. 5, 2007.

(51) Int. Cl.
*G06Q 40/00* (2006.01)
(52) U.S. Cl. .......................................... 705/44; 705/35
(58) Field of Classification Search .................. 705/44; 707/609
See application file for complete search history.

(56) References Cited

U.S. PATENT DOCUMENTS

| | | | |
|---|---|---|---|
| 5,790,667 A | 8/1998 | Omori et al. | |
| 6,857,566 B2 | 2/2005 | Wankmueller | |
| 6,990,470 B2 | 1/2006 | Hogan et al. | |
| 7,024,395 B1 | 4/2006 | McCown et al. | |
| 7,668,871 B1 * | 2/2010 | Cai et al. | 707/609 |
| 2002/0007320 A1 | 1/2002 | Hogan et al. | |
| 2002/0120846 A1 | 8/2002 | Stewart et al. | |
| 2003/0120592 A1 | 6/2003 | Ng | |
| 2005/0033686 A1 | 2/2005 | Peart et al. | |
| 2005/0033688 A1 | 2/2005 | Peart et al. | |
| 2005/0077349 A1 | 4/2005 | Bonalle et al. | |
| 2005/0080730 A1 | 4/2005 | Sorrentino | |
| 2007/0055630 A1 * | 3/2007 | Gauthier et al. | 705/44 |
| 2007/0170243 A1 | 7/2007 | Desany et al. | |
| 2009/0008441 A1 | 1/2009 | Montgomery et al. | |

OTHER PUBLICATIONS

"PCT International Search Report of the International Searching Authority", mailed Sep. 9, 2008, for PCT/US08/65756, 2pgs.

* cited by examiner

*Primary Examiner*—Jason M Borlinghaus
*Assistant Examiner*—Samica L Norman
(74) *Attorney, Agent, or Firm*—Buckley, Maschoff & Talwalkar LLC

(57) ABSTRACT

A method includes receiving an authorization request for a purchase transaction, and determining whether the authorization request arose from proximity-reading a proximity payment device. The method further includes mapping a first account number included in the authorization request into a second account number associated with the first account number if it is determined that the authorization request arose from proximity-reading a proximity payment device and if the first account number is qualified for mapping. In addition, the method includes transmitting the authorization request to an issuer financial institution with the second account number substituted for the first account number in the authorization request.

10 Claims, 13 Drawing Sheets

METHODS AND APPARATUS FOR PREVENTING FRAUD IN PAYMENT PROCESSING TRANSACTIONS

CROSS-REFERENCE TO RELATED APPLICATION

This application claims the benefit of provisional patent application Ser. No. 60/942,073, filed Jun. 5, 2007, which application is incorporated herein by reference.

BACKGROUND

Proximity payment devices and systems are becoming increasingly popular. One such system is the "PayPass" system operated by MasterCard International Incorporated, which is the assignee hereof. MasterCard issuers now have the option of issuing PayPass payment devices to their cardholders. Some proximity payment devices (including proximity payment devices issued in the PayPass system) may have both a magnetic stripe (such as is provided on conventional credit or debit cards) as well as a data storage device or chipset (also referred to as a radio frequency identification or "RFID" chip) and an antenna to which the storage device is coupled. Both the RFID chip and the antenna may be embedded in the body of the proximity payment device. The body of the proximity payment device may have the same shape and dimensions as a conventional payment card such as a credit card or a debit card.

The RFID chip may store an account number to be wirelessly transmitted from the proximity payment device (via the antenna) when the payment device is presented for proximity coupling to a point-of-sale terminal.

Further, proximity payment devices of the type described above may be used in conjunction with conventional point-of-sale terminals (or in mail order or telephone transactions or other non-face to face transactions) where an account number stored in a magnetic stripe, or embossed or printed on a face of the payment device, is read and transmitted for use in a transaction.

That is, some proximity payment devices may be used in proximity or wireless transactions as well as in standard payment card transactions. A proximity payment device may be manufactured in a variety of form factors, including as a conventional-sized payment card or as a fob, keyring, wristband, or the like. These proximity payment devices have enjoyed great success recently. Often, when the proximity payment device is not in the form factor of a conventional payment card, the proximity payment device (e.g., a fob or wristband) may not include a magnetic stripe and so is intended to be used only for transactions in which proximity coupling is used to read the account number from the RFID chip in the proximity payment device.

Applicants have recognized a need to provide enhanced security for proximity payment devices. One issue that applicants have addressed is the potential for proximity payment devices to be read by unauthorized persons who have the intention of collecting account numbers for fraudulent purposes.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

Figure 1:
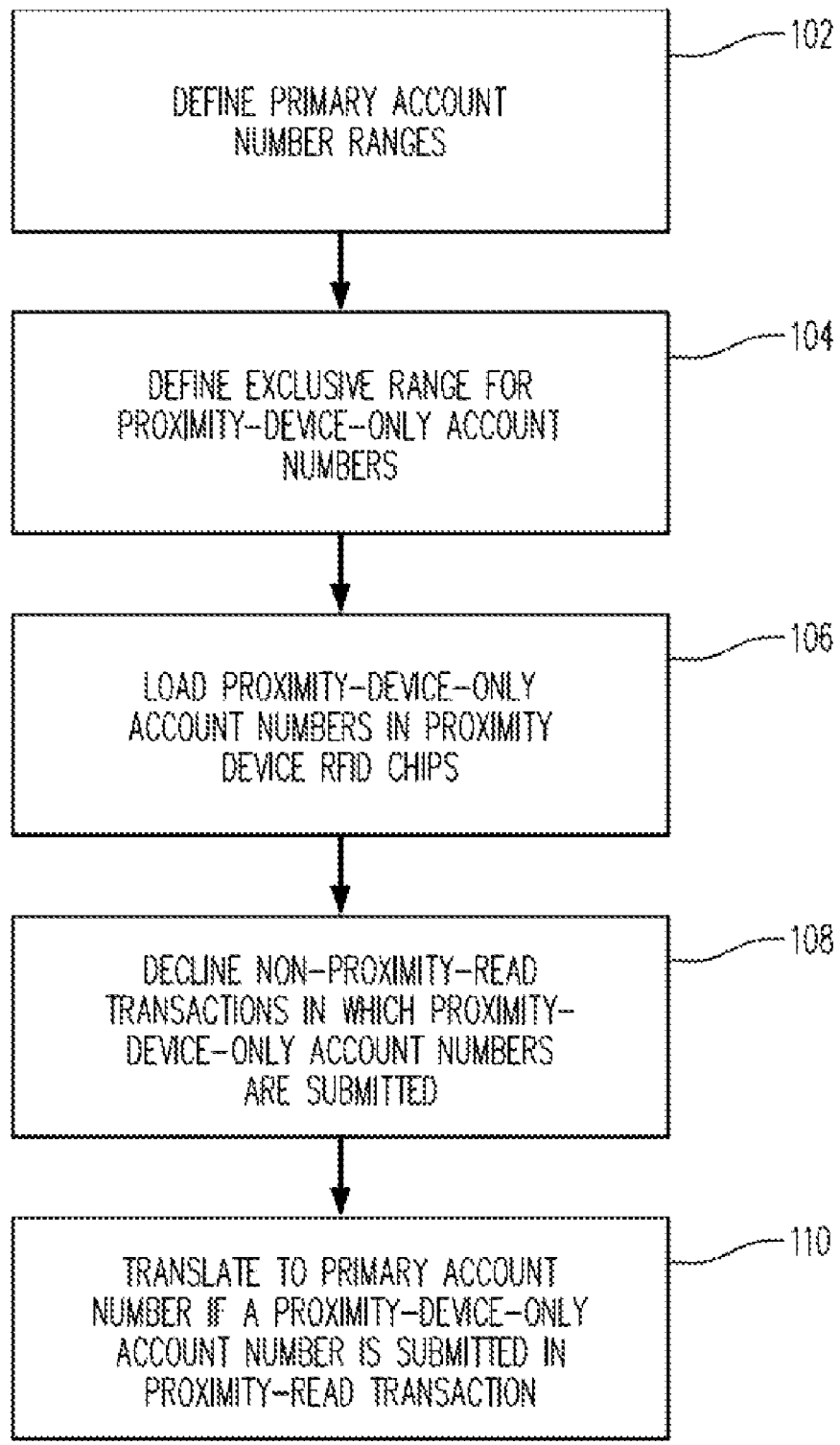
FIG. 1 is a flow chart that illustrates, at a high level, an anti-fraud strategy that is an aspect of the present invention.

In general, and for the purpose of introducing concepts of embodiments of the present invention, a payment card system may be organized so that account numbers that are available for reading by proximity communication from proximity payment devices are not accepted for payment card system transactions unless such account numbers are entered into the system via a proximity reader that is part of a point of sale terminal. In other words, a special class of account numbers is created that are assigned only to proximity payment devices and that are not stored on the magnetic stripes of magnetic stripe payment cards. Each account number that is issued from this special class of account numbers is associated with a so-called "primary account number" or "PAN". The PANs are used to identify actual payment card accounts and may be stored on the magnetic stripes of payment cards in a conventional manner. When an account number from the special class of account numbers (hereinafter referred to as "proximity-device-only account numbers") is properly read by proximity reading at a point of sale terminal, the proximity-device-only account number is included in a transaction authorization request initiated by the POS terminal. The payment system, and particularly a computer operated by the payment card association (e.g., MasterCard International Inc.), looks up the PAN with which the proximity-deviceonly account number is associated and substitutes the associated PAN for the proximity-device-only account number while forwarding the authorization request on to the issuer of the proximity payment device.

However, in the event that the authorization request received by the payment card association computer does not indicate that the transaction arose from proximity-reading a proximity payment device at a POS terminal, then the payment card association computer does not translate the proximity-device-only account number into the associated PAN. Instead, an error message is generated and the authorization request is declined.

With this mode of handling transactions involving proximity-device-only account numbers, such account numbers will be accepted only in transactions in which they are properly read from proximity payment devices. Consequently, if a wrongdoer improperly obtains a proximity-device-only account number and attempts to use it in an online purchase, or a telephone purchase, or by mail order, or by writing the proximity-device-only account number proximity-device-only account number into the magnetic stripe of a counterfeit payment card and then presenting the counterfeit card at a POS terminal, all of these attempted fraudulent transactions are likely to fail because the resulting authorization requests would be declined.

It should be noted that while creation of counterfeit magnetic stripe payment cards is known to be within the capabilities of some wrongdoers, it is much more difficult, and likely beyond the capabilities of most if not all wrongdoers, to create counterfeit proximity payment devices including the required microelectronic components (RFID chips) and then to store misappropriated account numbers in the RFID chips.

Thus the above-mentioned special class of proximity-device-only account numbers, and the transaction handling regime described above (and in further detail below) may provide a strong barrier against fraudulent transactions arising from unauthorized reading of proximity payment devices.

Additional security may be provided by utilization of a dynamic security code that uses cryptographic techniques to confirm the validity of proximity payment devices.

Another advantage provided by many or all of the embodiments described herein is that the security features provided according to the invention may require little or no modification of the transaction processing systems currently installed and in use by acquirer and issuer financial institutions. (As is well-known to those who are skilled in the art, an "acquirer" financial institution is one which has a banking relationship with the merchant that initiates the purchase transaction. Thus the acquirer (or a service provider acting on the acquirer's behalf) forwards authorization requests to the payment card association for routing to the issuer financial institutions. The "issuer" is the financial institution that issued the payment card/proximity payment device presented by the customer (or issued the account identified by the account number submitted online or over the phone). Thus the issuer (or a service provider acting on the acquirer's behalf) may refer to the status of the customer's payment card account to determine whether to approve or decline the authorization request.)

FIG. 1 is a flow chart that illustrates, at a high level, an anti-fraud strategy that is an aspect of the present invention.

At 102 in FIG. 1, a payment card association and/or one or more of its member payment card issuers define one or more ranges of account numbers that are to be assigned as primary account numbers (PANs) for payment card accounts. In accordance with conventional practices, the leading digits of the PAN ranges correspond to bank identification numbers (BINs) that identify the issuing financial institutions for the payment card accounts.

At 104 in FIG. 1, the payment card association and/or one or more of its member payment card issuers define one or more ranges of account numbers that are to be used exclusively in proximity-read purchase transactions, and thus are to be loaded into the RFID chips of proximity payment devices. As noted above, these special account numbers may be referred to as "proximity-device-only account numbers". When issued, each proximity-device-only account number is associated with a previously issued PAN.

At 106 in FIG. 1, issuer financial institutions, and/or the payment card association acting on behalf of an issuer financial institution, causes proximity-device-only account numbers to be loaded into proximity payment devices to be issued to holders of the payment card accounts identified by the PANs with which the proximity-device-only account numbers are associated. For example, a proximity-device-only account number may be loaded into the RFID chip of a payment card, while the associated PAN is stored on the magnetic stripe on the card and is embossed on the face of the card. Alternatively, the proximity-device-only account number may be loaded into the RFID chip of a proximity payment device that is not card-shaped (e.g., a fob or wristband), and the proximity payment device may then be mailed to an account holder who already has a magnetic stripe payment card that carries the PAN associated with the proximity-device-only account number. More details of one example process for issuing proximity payment devices will be described below.

At 108, the payment card system operates such that transactions are declined in cases in which a proximity-device-only account number is submitted to pay for the transaction but the transaction was not initiated by proximity-reading a proximity payment device. As noted above, this step enforces a measure that would prevent misappropriated proximity-device-only account numbers from being fraudulently tendered for mag-stripe transactions, internet orders, phone orders, etc.

At 110, the payment card system operates such that, for transactions initiated by proximity-reading a proximity payment device to receive a proximity-device-only account number, the system or the issuer financial institution translates the proximity-device-only account number initially included in the authorization request into its associated PAN and then proceeds to process the transaction as if the PAN had been tendered for the transaction.

Figure 2:
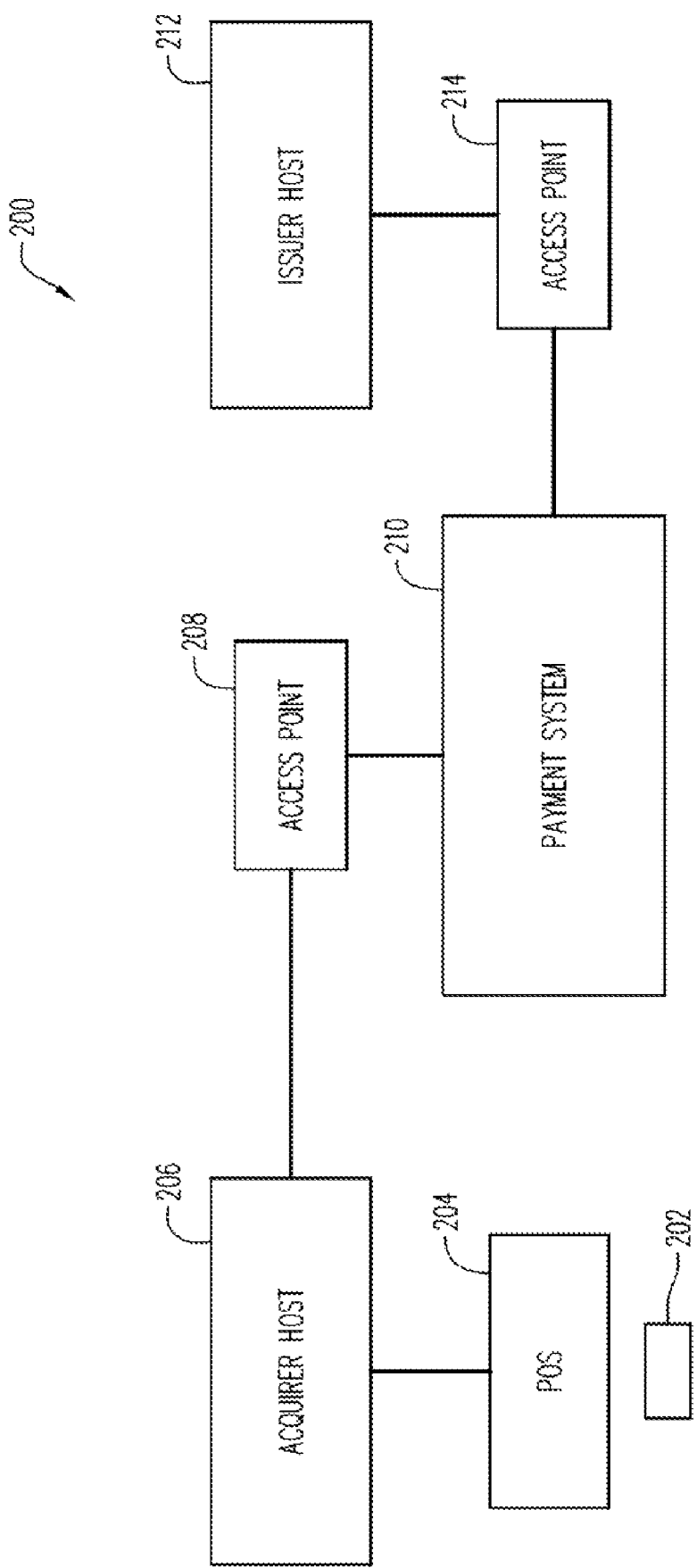
FIG. 2 is a block diagram that illustrates a payment card transaction processing system provided according to some embodiments.

FIG. 2 is a block diagram that illustrates a payment card transaction processing system 200 provided according to some embodiments.

Reference numeral 202 indicates a proximity payment device, which is presented for reading by a point of sale terminal 204 to initiate a purchase transaction in the payment card transaction processing system 200. Both the proximity payment device 202 and the POS terminal 204 may be considered to be part of the payment card transaction processing system 200. The proximity payment device 202 may, for example, have an RFID chip (not separately shown) coupled to an antenna (not separately shown). A proximity-device-only account number may be stored in the RFID chip and may be transmitted to the POS terminal in response to an interrogation signal from the POS terminal. This may occur, for example, and in accordance with conventional practices, when the proximity payment device is tapped on a proximity reader component (not separately shown) that is part of, or associated with, the POS terminal 204. In some embodiments, the proximity payment device is shaped as a fob or wristband or has another convenient, non-card-shaped form factor. In other embodiments, the proximity payment device has the shape and size (and appearance) of a conventional payment card. In the latter case, the proximity payment device may have a magnetic stripe and a PAN stored in the magnetic stripe to allow the device also to be read by "swiping" through a standard magnetic stripe reader. The PAN stored in the mag stripe is the one with which the proximity-device-only account number stored in the RFID chip is associated. Thus, the PAN is stored in the mag stripe, and the different but associated proximity-device-only account number is stored in the RFID chip on the card. In accordance with conventional practice, the PAN may also be embossed on the face of the card, for use, e.g., in internet, mail or phone orders.

The POS terminal is in data communication, directly or indirectly, and at least from time to time, with a host computer 206 that is part of the payment card transaction processing system 200 and is operated for or on behalf of the acquirer financial institution which handles payment card transactions for the merchant which operates the POS terminal. Both the acquirer host computer 206 and the POS terminal 204 may be constituted and may operate in a conventional manner.

Reference numeral 208 indicates an access point. The access point 208 is a conventional device via which the acquirer host computer is able to exchange data messages with a payment system computer 210 that is a central component in the payment card transaction processing system 200. In accordance with conventional practices, the payment system computer may be operated by or on behalf of a payment card association (of which a prominent example is MasterCard International Inc., the assignee hereof) and provides the central switching and message routing functions among the member financial institutions of the payment card association. Further details of the payment system computer 200 will be provided below, including aspects of the payment system computer that are provided in accordance with aspects of the present invention.

The payment card transaction processing system 200 also includes an issuer host computer 212, and an access point 214 via which the issuer host computer 212 exchanges data messages with the payment system computer 210.

Although only one proximity payment device, one POS terminal, one acquirer host computer, one issuer host computer and two access points are shown in the drawing, it should be understood that in practice the payment card transaction processing system 200 may include a large number of proximity payment devices, POS terminals, acquirer host computers, issuer host computers, and access points. In particular, the drawing only shows components that are active in connection with a single transaction out of a large number of transactions that may be handled by the payment card transaction processing system 200 on an ongoing basis. Of course, the payment card transaction processing system 200 may also include payment cards that are not proximity payment devices.

In some embodiments, all of the components of the payment card transaction processing system 200 may be entirely or substantially conventional, except that the payment system computer 210 may store data and may be programmed to perform functions in accordance with aspects of the present invention. The proximity payment device 202 may also be conventional in its operation and structure. However, the proximity payment device may store in its RFID chip a proximity-device-only account number, and if the proximity payment device is also a mag strip card, the mag stripe may store a PAN that is associated with but different from the proximity-device-only account number stored in the RFID chip.

In general the acquirer host computer 206 performs its conventional functions of receiving authorization requests from POS terminals, forwarding the authorization requests through the payment card transaction processing system, receiving authorization responses, and relaying the authorization responses to the POS terminals. Moreover, the issuer host computer 212 may in general perform its conventional function of receiving authorization requests from the payment system computer 210 and transmitting authorization responses back to the payment system computer 210 with respect to the authorization requests.

Figure 3:
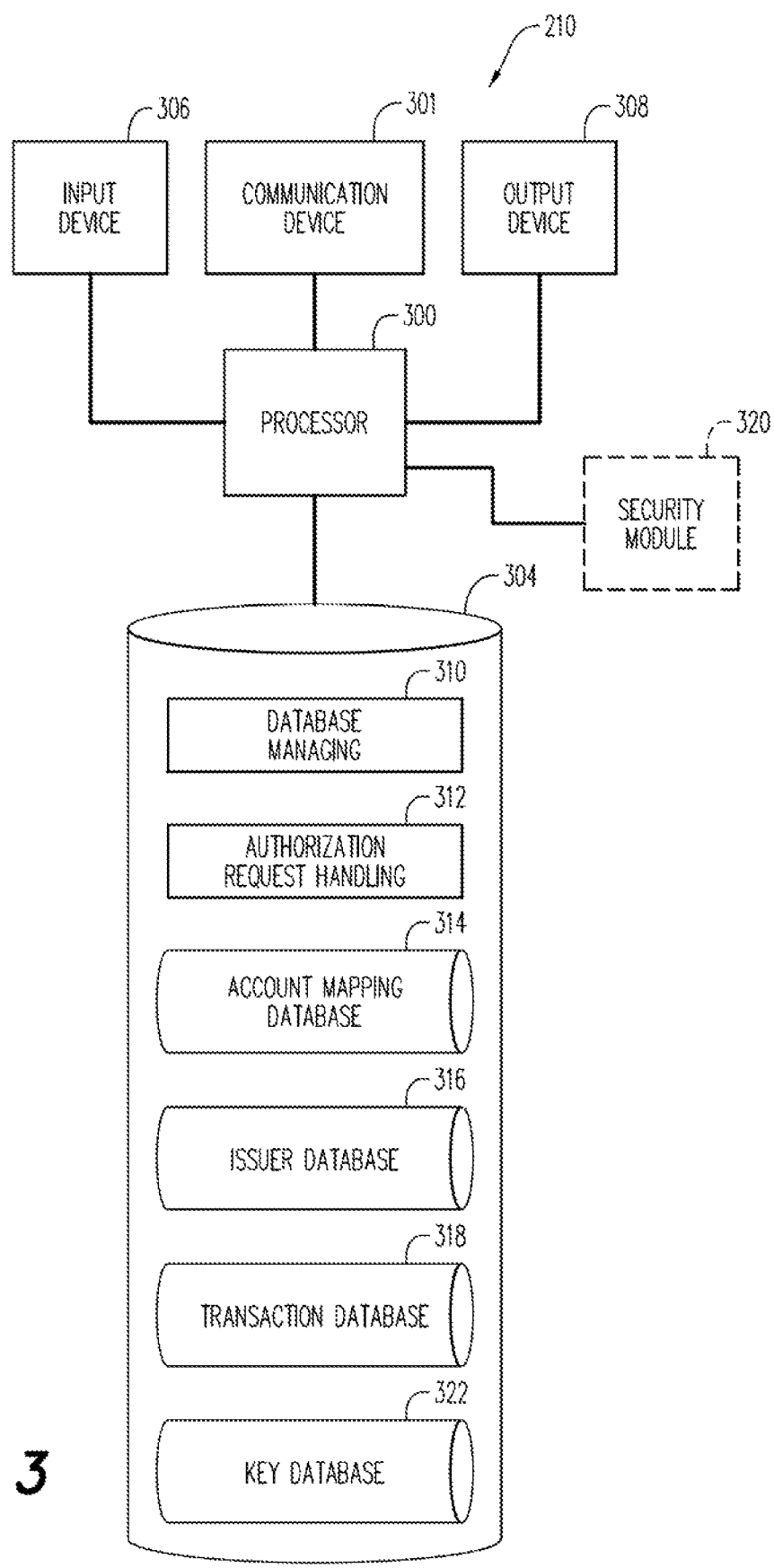
FIG. 3 is a block diagram that illustrates a computer that may be operated by a payment card association in connection with the system of FIG. 2.

FIG. 3 is a block diagram that illustrates details of the payment system computer 210 shown in FIG. 2. The payment system computer 210 may be conventional in its hardware aspects but may be controlled by software and may store data to allow it to operate in accordance with aspects of the present invention.

Referring, then, to FIG. 3, the payment system computer 210 may include a computer processor 300 operatively coupled to a communication device 301, a storage device 304, an input device 306 and an output device 308.

The computer processor 300 may be constituted by one or more conventional processors. Processor 300 operates to execute processor-executable steps, contained in program instructions described below, so as to control the payment system computer 210 to provide desired functionality.

Communication device 301 may be used to facilitate communication with, for example, other devices (such as access points 208, 214, acquirer host computer 206 and issuer host computer 212).

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 304 stores one or more programs for controlling processor 300. The programs comprise program instructions that contain processor-executable process steps of payment system computer 210, including, in some cases, process steps that constitute processes provided in accordance with principles of the present invention, as described in more detail below.

The programs may include a database management application 310 that allows the payment system computer 210 to generate, maintain, update and query certain databases that are described below. The programs may also include an application program 312 for processing authorization requests sent to the payment system computer 210 from acquirer host computers. As will be seen, in a larger sense, the process of handling authorization requests also entails processing authorization responses sent to the payment system computer 210 by issuer host computers in response to authorization requests.

Storage device 304 may also store an account mapping database 314. The account mapping database 314 may store a record for each issued proximity-device-only account number to indicate which PAN the proximity-device-only account number is associated with. In a process that is described below, the account mapping database 314 allows the payment system computer 210 to map proximity-device-only account numbers to their corresponding PANs so that the proximity-device-only account numbers can be replaced with PANs before passing authorization requests on to the issuer financial institution.

Storage device 304 may also store an issuer database 316. The issuer database 316 may map the BIN portion of PANs to the relevant data communication address information so that authorization requests can be properly routed to the issuer financial institutions.

Further, storage device 304 may store a transaction database 318. The transaction database 318 may be used to keep records of the transactions processed by the payment system computer 210. In some embodiments, the transaction database 318 may be constituted by, or may be regularly flushed to, a data warehouse that is maintained on a separate computer (not shown). The transaction data in the database 318 may be used, for example, for post audit purposes or as required in connection with subsequent clearing of the transactions.

The storage device 304 may also include a key database 322. The key database 322 may store information used (as described below) in checking a cryptographic security code generated for each transaction by the proximity device.

The storage device 304 may store additional software programs which are not indicated in the drawing, but which may include one or more operating systems, device drivers, etc.

The payment system computer 210 may further include a hardware security module 320 (indicated in phantom) which may be in communication with the processor 300. The hardware security module 320 may be provided to enhance the security of certain processes (discussed below) whereby the payment system computer 210 confirms the validity of security codes that may be included in authorization requests received from acquirer host computers.

Figure 4:
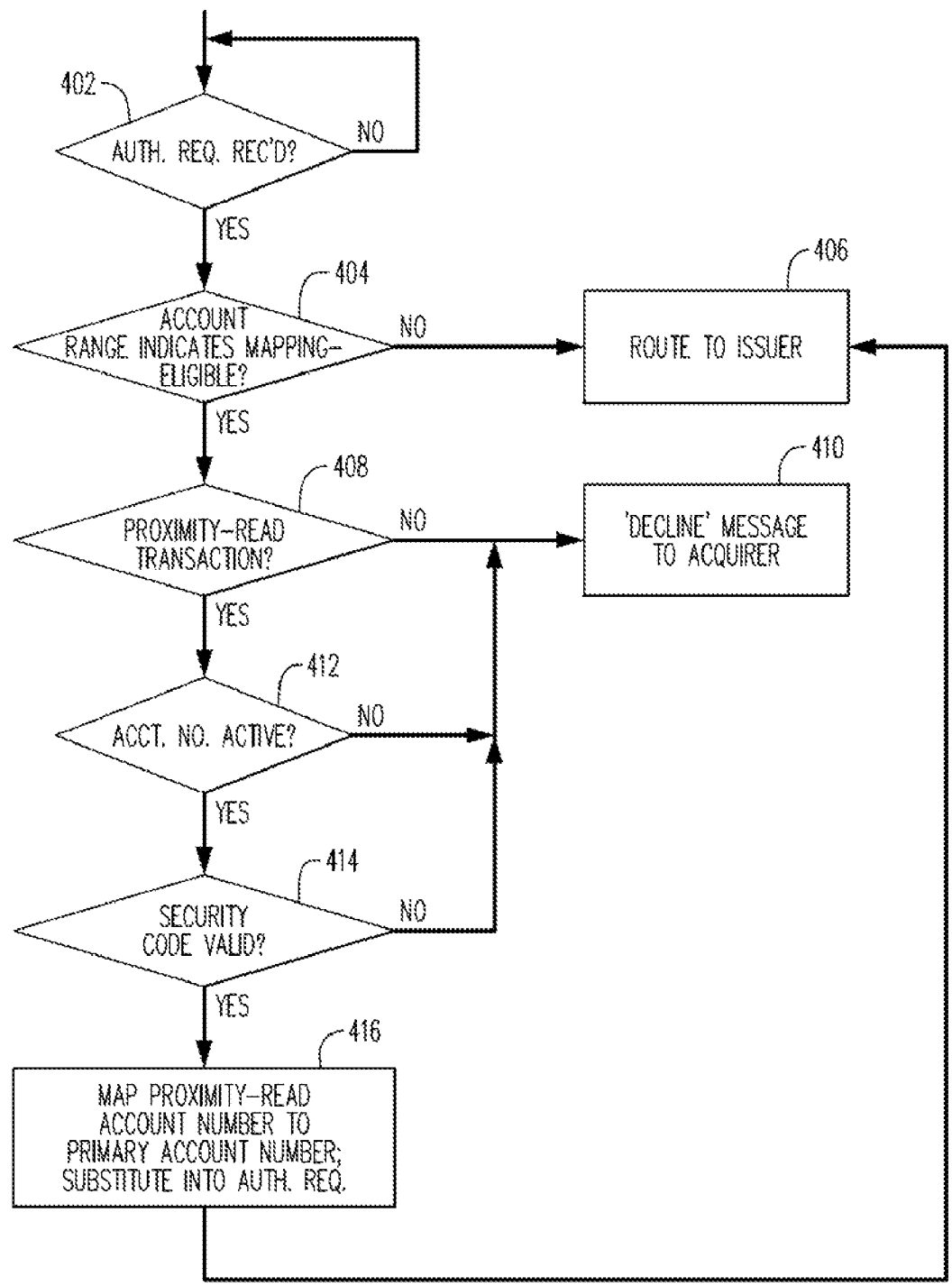
FIG. 4 is a flow chart that illustrates a process that may be performed by the computer of FIG. 3.

FIG. 4 is a flow chart that illustrates a process that may be performed by the payment system computer 210 in accordance with aspects of the present invention.

At 402 in FIG. 4, the process, or a particular processing thread, idles until an authorization request is received from the acquirer host computer 206. Once an authorization request has been received, processing advances to decision block 404. At decision block 404, the payment system computer 210, and particularly processor 300 (FIG. 3), parses the authorization request to determine the account number that was submitted in connection with the purchase transaction that is the subject of the authorization request. Further, in decision block 404, the payment system computer 210 determines from the BIN portion of the account number whether the account number is from a range of account numbers that have been set aside for proximity-device-only account numbers that are eligible for mapping. If not, then the authorization request is forwarded on, in normal fashion, to the issuer of the account identified by the account number, as indicated at 406 in FIG. 4.

However, if a positive determination is made at 404 (i.e., the account number in the authorization request is in a range of account numbers reserved for proximity-device-only account numbers that are eligible for mapping), then decision block 408 follows decision block 404. At decision block 408, the payment system computer 210 determines whether the authorization request indicates that the purchase transaction was initiated by proximity-reading a proximity payment device. If a negative determination is made 408 (i.e., the purchase transaction is based on a mag stripe read, an internet based transaction, or another sort of transaction other than proximity-reading a proximity payment device), then it is likely that the transaction is fraudulent, since, by the process logic, it had previously been determined that the account number was from a range of account numbers reserved for proximity-device-only account numbers. Accordingly, following a negative determination at 408, the payment system computer 210 sends a message (as indicated at 410 in FIG. 4) to the acquirer host computer 206 to indicate that the authorization request is declined. (As will be appreciated, the "declined" message would then be passed on to the POS terminal 204—or other merchant device that originated the authorization request—by the acquirer host computer 206.)

However, if a positive determination is made at 408 (i.e., the transaction is of the proper—proximity-read—type), then the payment system computer 210 performs another check, as indicated at decision block 412. In particular, at decision block 412 the payment system computer 210 determines whether the account number included in the authorization request is listed as currently active. This check may be performed by a reference to a suitable database, which may be the account mapping database 314 shown in FIG. 3.

If it is determined at decision block 412 that the account number is not active, then (step 410) the payment system computer 210 sends a message to the acquirer host computer 206 that the authorization request is declined. (As mentioned above, the "declined" response would then be passed from the acquirer host computer 206 to the POS terminal 204.)

However, if at 412 the account number is determined to be active, then the process of FIG. 4 may advance to another check, which is indicated at decision block 414. At decision block 414, the payment system computer 210 may check the validity of a security code that was included in the authorization request. In some embodiments, the security code may be a static value that is always read from the proximity payment device for each transaction. More preferably, however, the security code may be dynamic, as is the case with the so-called "dynamic CVC3" security code called for by the PayPass standard for proximity payment devices. A description of the dynamic CVC3 security code is contained in a paper entitled "PayPass Information Paper: ATC Regeneration and Tracking" (Version 1.4) published by MasterCard International Inc. on Oct. 26, 2004, and hereby incorporated herein by reference. To briefly summarize certain aspects of the dynamic CVC3 feature, the proximity payment device 202 performs a cryptographic calculation to generate the dynamic CVC3 for the transaction based on the following inputs: (a) a cryptographic key, (b) an "unpredictable number" generated for the transaction by the POS terminal 204 and transmitted to the proximity payment device 202 from the POS terminal 204 in connection with the transaction, (c) a transaction count value maintained in the proximity payment device to indicate how many transactions the proximity payment device has been used for, and (d) certain static data stored in the proximity payment device.

In some embodiments of decision block 414, the payment system computer 210 may attempt to reproduce the cryptographic calculation performed by the proximity payment device 202 to determine whether the cryptographic calculation as performed by the payment system computer 210 produces the same result as the dynamic CVC3 security code generated by the proximity payment device and included in the authorization request. The payment system computer 210 may obtain the inputs (a) and (d) referred to above from a database that is available to the payment system computer 210. For example, this information may be stored in the key database 322. Input (b)—the unpredictable number generated for the transaction by the POS terminal 204—may be included with the authorization request. The payment system computer 210 may regenerate input (c)—the transaction count value—from one or more low-order digits of the transaction count value included with the authorization request, by also using transaction count information independently stored by the payment system computer 210 for the proximity payment device in question.

If the security code check performed at 414 fails, then the payment system computer 210 may send a message to decline the authorization request to the acquirer host computer 206, as indicated at 410. However, if the security code is found at 414 to be valid, then step 416 may follow 414. At 416, the payment system computer 210 may access the account mapping database 314 to translate the proximity-device-only account number included in the authorization request to the PAN with which the proximity-device-only account number is associated. Then, at 406, the payment system computer 210 may route the authorization request to the issuer host computer 212 with the PAN substituted for the proximity-device-only account number that was initially included in the authorization request as received by the payment system computer 210 from the acquirer host computer 206. It will be appreciated that the issuer host computer 212 may then determine whether to accept or decline the authorization request (with the PAN included therein) in accordance with conventional practices.

In some embodiments, the authorization request, as sent from the payment system computer 210 to the issuer host computer, may include an auxiliary data section containing the proximity-device-only account number initially included in the authorization request as received by the payment system computer 210. This may be done for convenience of reference in later processing, but the proximity-device-only account number most likely would not be used by the issuer host computer 212 for the purpose of accessing the customer's account to determine whether the authorization request should be approved.

Although this is not explicitly indicated in FIG. 4, in some embodiments, when the payment system computer 210 passes the authorization request to the issuer host computer 212, the payment system computer 210 may include an indication as to whether the security code was found to be valid (cf. step 1006, discussed below in connection with FIG. 10).

Figure 5:
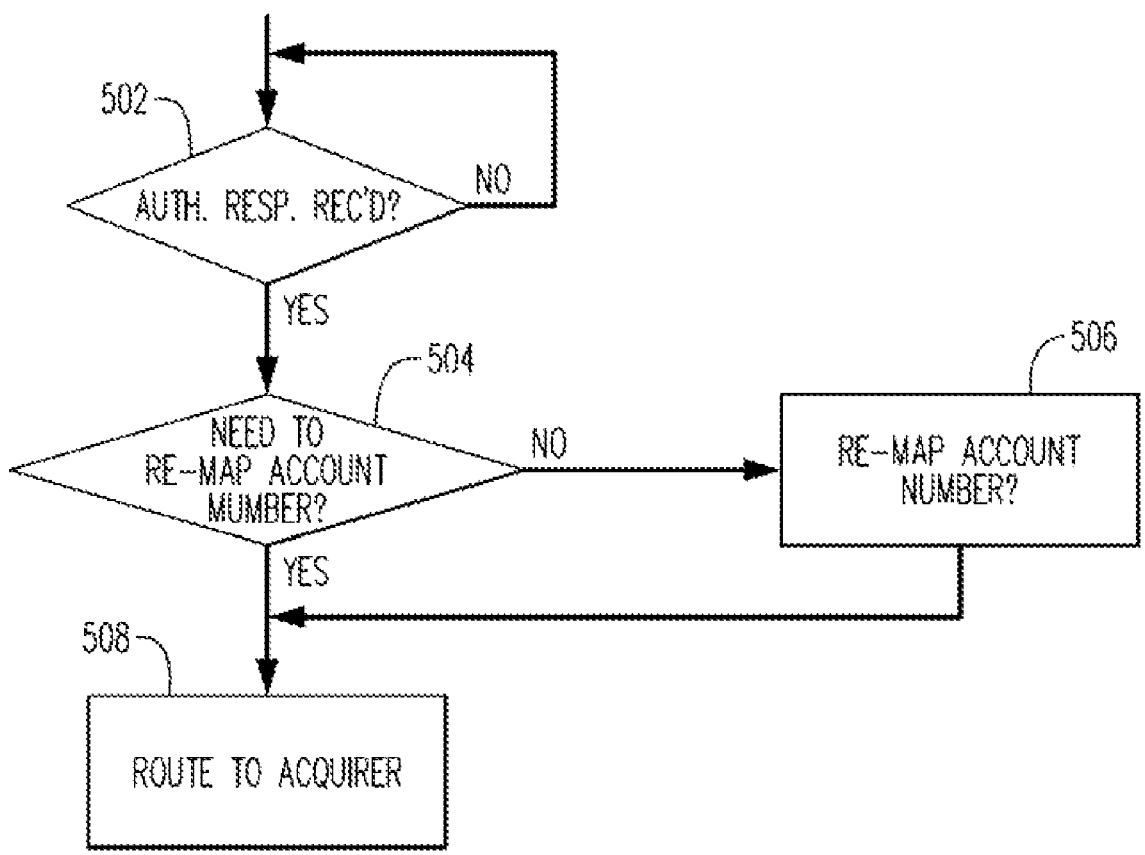
FIG. 5 is a flow chart that illustrates a further process that may be performed by the computer of FIG. 3.

Whether the issuer host computer 212 determines that the authorization request should be approved or declined, in either case the issuer host computer 212 would transmit an authorization response back to the payment system computer 210. FIG. 5 is a flow chart that illustrates a process that may be performed by the payment system computer 210 in handling the authorization response received from the issuer host computer 212.

At 502 in FIG. 5, the process, or a particular processing thread, idles until the authorization response is received from the issuer host computer 212. Once the authorization response has been received, processing advances to decision block 504. At decision block 504, the payment system computer 210, and particularly processor 300 (FIG. 3), determines whether the authorization response requires that the PAN included in the authorization response be translated back to the proximity-device-only account number that was included in the authorization request. That is, the payment system computer 210 determines whether the authorization response is responding to an authorization request for which the payment system computer 210 performed proximity-device-only account number to PAN mapping. The payment system computer 210 may make this determination, for example, based on a code or flag in the authorization response. Alternatively, the payment system computer 210 may make this determination by using a transaction reference number included in the authorization response to access a database (e.g., transaction database 318, FIG. 3) to look up information concerning the authorization request to determine whether proximity-device-only account number to PAN mapping was performed by the payment system computer 210 with reference to the authorization request.

If the payment system computer 210 determines at 504 that PAN to proximity-device-only account number mapping is needed, then it proceeds with the mapping, as indicated by block 506 in FIG. 5. That is, the payment system computer 210 may access the account mapping database 314—additionally or alternatively, the payment system computer 210 may access the transaction database 318—for the purpose of determining the proximity-device-only account number to be substituted for the PAN included in the authorization response received from the issuer host computer 212. For example, if it is the case that more than one proximity payment device has been issued for a given payment card account, such that more than one proximity-device-only account number is associated with the PAN which identifies the payment card account, then the transaction database 318 may be the sole available source of information concerning which of the associated proximity-device-only account numbers was included in the authorization request received from the acquirer host computer 206. The reference to the transaction database 318 may be based on a transaction reference number included by the issuer host computer 212 in the authorization response; the same transaction reference number may have been previously included in the authorization request as sent to the issuer host computer 212 by the payment system computer 210.

Step 508 follows step 506 in the process of FIG. 5. At step 508, the payment system computer 210 routes the authorization response to the acquirer host computer 206 with the proximity-device-only account number that was obtained at 506 inserted in the authorization response in place of the PAN that was in the authorization response as it was received by the payment system computer 210 from the issuer host computer 212. In some embodiments, the authorization response, as sent from the payment system computer 210 to the acquirer host computer 206, may include an auxiliary data section that contains the PAN that was included in the authorization response as received by the payment system computer 210 from the issuer host computer 212.

It will be appreciated that the acquirer host computer 206 will forward the authorization response on to the POS terminal 204, and in accordance with conventional practices the purchase transaction at the POS terminal 204 will be completed or aborted, depending on whether the authorization response indicates that the authorization request was approved or declined. It will also be appreciated that when the process of FIG. 4 terminates in step 410 ("decline" message sent to acquirer host computer), in such cases the acquirer host computer 206 will pass the "decline" message to the POS terminal 204, causing the purchase transaction to be aborted.

In some embodiments of the process of FIG. 4, the payment system computer 210 forwards the authorization request to the issuer host computer 212 even if the security code was not found to be valid. If the process of FIG. 4 is so embodied, then the process of FIG. 5 may include steps (not shown) in which the payment system computer 210 refers to the transaction database 318 to determine whether the security code included in the authorization request did not check out, and if so the payment system computer 210 may insert an error message to that effect in the authentication response before forwarding the authentication response to the acquirer host computer 206. It may also be the case in the process of FIG. 4 that, if the security code in the authorization request does not check out, the payment system computer 210 includes an indication to that effect in the authorization request as forwarded from the payment system computer 210 to the issuer host computer 212.

In some embodiments, transactions for which the authorization requests are approved may subsequently be cleared (e.g., in a batch mode) between the issuer and acquirer banks. The clearing function may be performed by the payment card association. In particular, the payment card association may operate one or more computers (not shown), in addition to the payment system computer depicted in FIGS. 2 and 3, for the purpose of performing clearing functions among the member banks of the payment card association. In accordance with aspects of the present invention, when a payment card association clearing computer (not shown) receives a clearing message from an issuer bank that contains a proximity-device-only account number, the payment card association clearing computer translates the proximity-device-only account number into the PAN with which the proximity-device-only account number is associated. Moreover, when appropriate to the particular transaction, the payment card association clearing computer translates PANs, received in clearing messages from issuer banks, into associated proximity-device-only account numbers.

In some embodiments, transaction data stored by the payment card association (e.g., in a "data warehouse") will include, when appropriate for particular transactions, both the PAN and the proximity-device-only account number. This may aid in subsequent inquiries about transactions.

Figure 6:
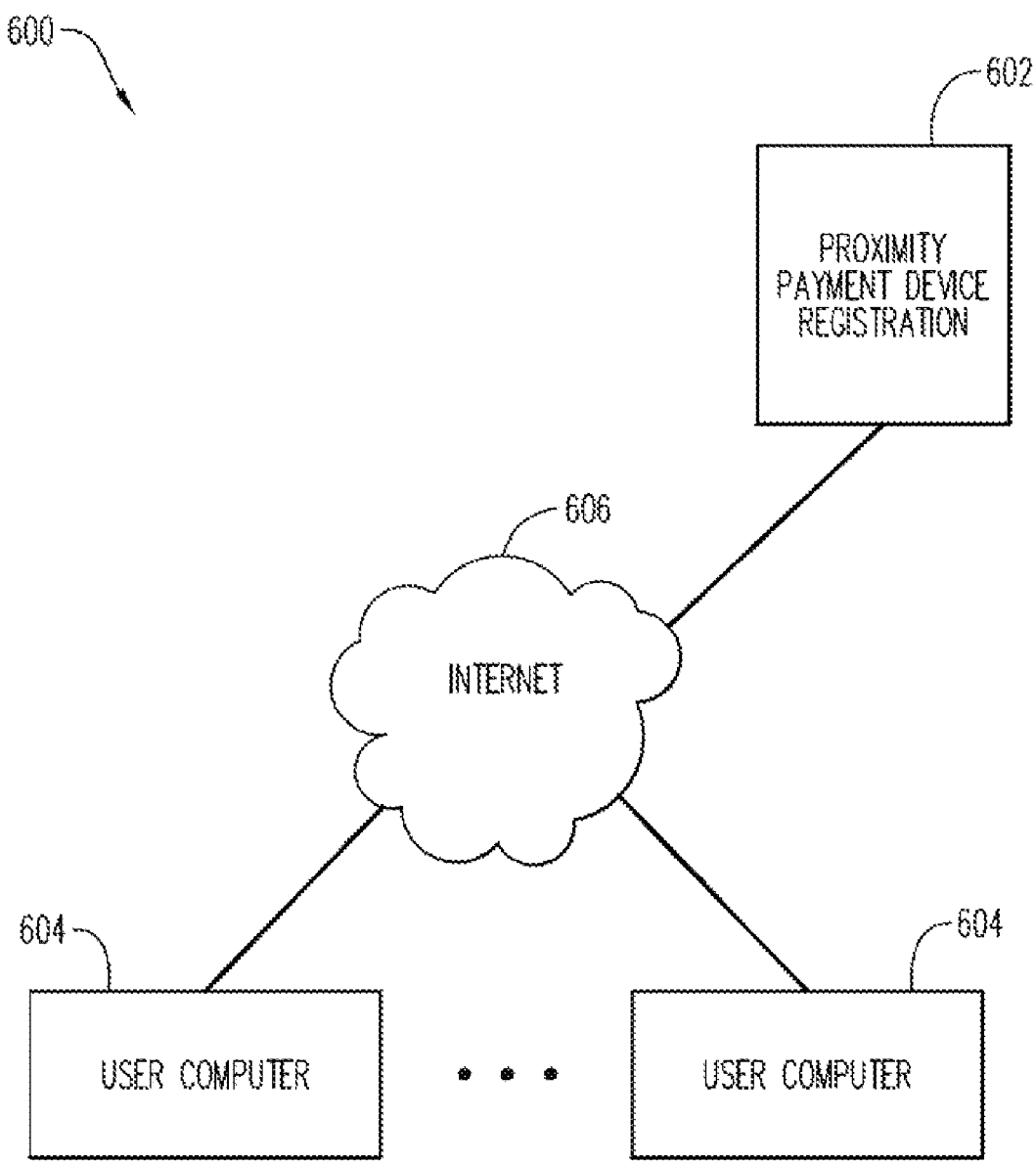
FIG. 6 is a block diagram that illustrates a system that is operable in connection with the present invention to allow payment card holders to apply for issuance of proximity payment devices.

In some embodiments, to increase convenience of operation for payment card account issuers, the payment card association, or another party, may take responsibility for issuing proximity payment devices and for associating the corresponding proximity-device-only account numbers with the appropriate PANs. FIG. 6 is a block diagram which illustrates a system 600 which handles at least some aspects of issuance of proximity payment card devices.

The system 600 shown in FIG. 6 includes a server computer 602 which hosts a website which allows payment card account holders to request and register for proximity payment devices. As noted above, the proximity payment device registration server computer 602 may be operated by a payment card association. The system 600 also includes numerous user computers 604 (e.g., conventional personal computers) that are in data communication on occasion with the proximity payment device registration server computer 602 via a data network 606 (e.g., the Internet). The user computers 604 may be operated from time to time by payment card account holders to initiate a registration procedure for a proximity payment device, as described below.

Although not shown in FIG. 6, a data communication network may connect the server computer 602 with the payment system computer 210 shown in FIGS. 2 and 3 and/or with the account mapping database 314 shown in FIG. 3.

Figure 7:
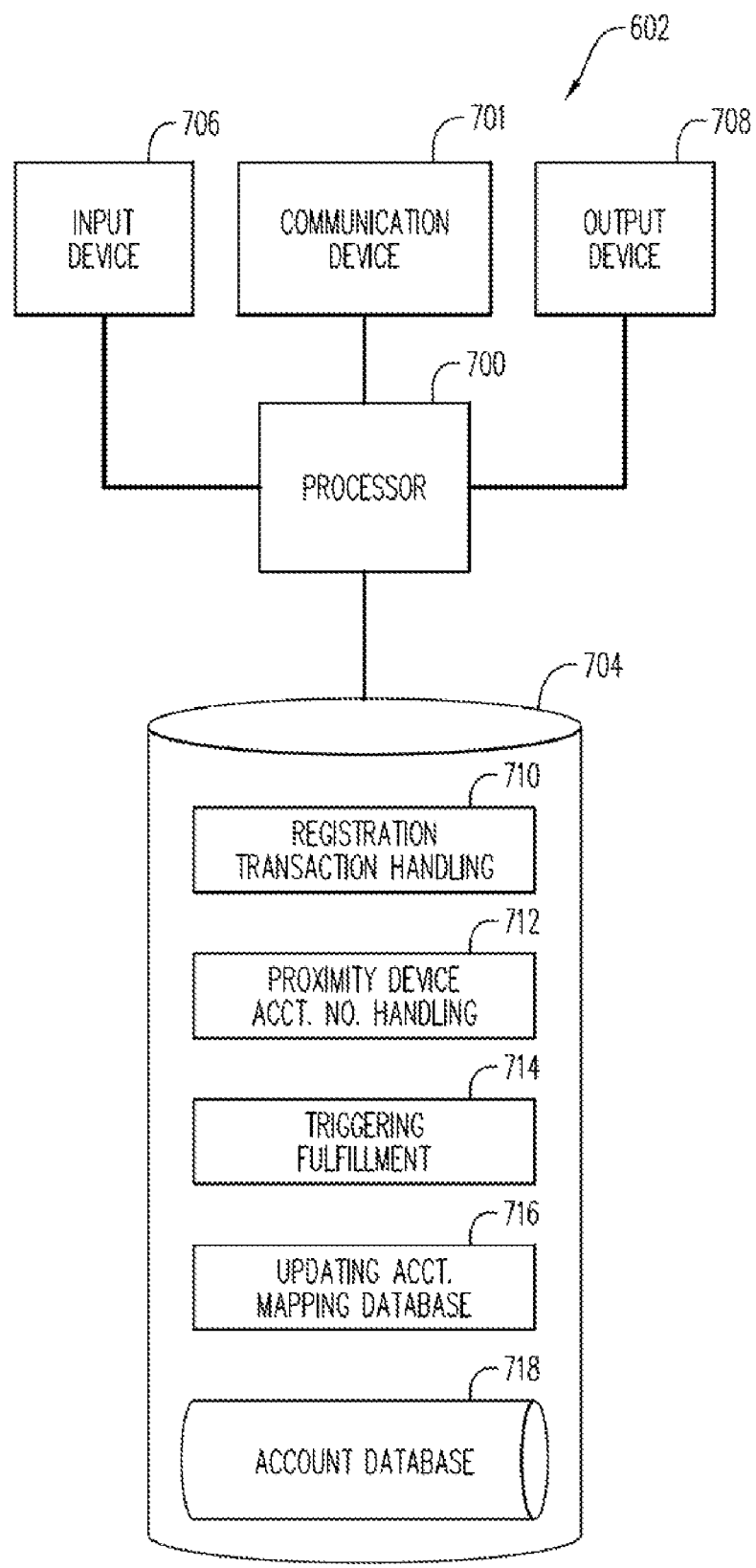
FIG. 7 is a block diagram representation of a computer that may be operated by a payment card association in the system of FIG. 6 in connection with certain aspects of the invention.

FIG. 7 is a block diagram representation of an example embodiment of the proximity payment device registration server computer 602. In its hardware aspects, the proximity payment device registration server computer 602 may be conventional, and similar to the hardware components described above in connection with the payment system computer 210. The hardware aspects of the proximity payment device registration server computer 602 will therefore not be further described, except to mention that the proximity payment device registration server computer 602 may include a processor 700 in communication with a communication device 701, a storage device 704, an input device 706, and an output device 708.

The storage device 704 may store the following application programs and/or program modules: (a) a program/module 710 to handle registration transactions initiated by payment card account holders; (b) a program/module 712 to assign proximity-device-only account numbers to proximity payment devices requested by payment card account holders in the registration transactions; (c) a program/module 714 to initiate actions required to supply proximity payment devices in response to the requests therefor by the payment card account holders; and (d) a program/module 716 to handle updating of an account number database (such as database 314) to reflect association of proximity-device-only account numbers with PANs as a result of fulfillment of requests for proximity payment devices.

Continuing to refer to FIG. 7, the storage device 704 may also store a database 718 of records for payment card accounts which were issued by the issuing financial institution in question and which are eligible for requests for proximity payment devices. The account database 718 may be indexed by the PANs for the payment card accounts, and the record for each account may also include information about the account holders, such as names and addresses.

The storage device 704 may store additional data and programs beyond those explicitly mentioned above. For example, the storage device 704 may store conventional programs such as one or more operating systems, web hosting software programs, database management programs, device drivers, etc.

Figure 8:
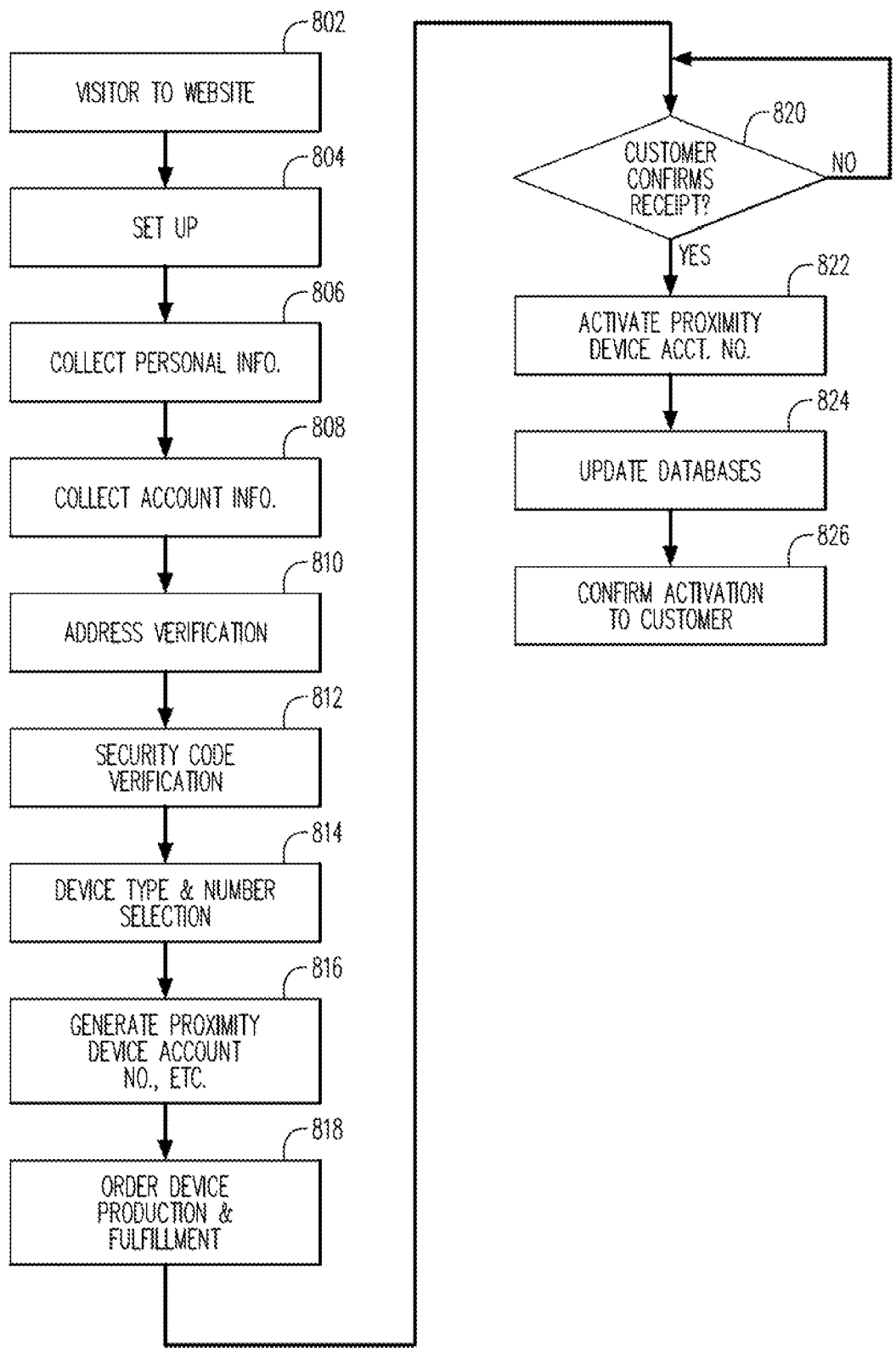
FIG. 8 is a flow chart that illustrates a process that may be performed by the computer of FIG. 7.

FIG. 8 is a flow chart that illustrates a process that may be performed by the proximity payment device registration server computer 602 in accordance with aspects of the present invention.

The process of FIG. 8 begins at 802 with a payment card account holder visiting the website hosted by the proximity payment device registration server computer 602. The payment card account holder may have initiated the website visit by operating his/her user computer 604 in a conventional manner. The payment card account holder may have chosen to visit the website hosted by the proximity payment device registration server computer 602 in response to activities undertaken by the issuing financial institution (and/or by the payment card association) to promote dissemination of proximity payment devices. For example, the payment card account holder may have received promotional literature about the availability of proximity payment devices, and the existence of and web address for the registration website, in a monthly payment card account statement that the payment card account holder received from the issuer. Alternatively, the payment card account holder may have navigated to the website hosted by the proximity payment device registration server computer 602 from a link provided on an online banking website or other website operated by or on behalf of the issuer.

The website hosted by the proximity payment device registration server computer 602 may preferably include a logo or logos associated with the issuer or other branding information related to the issuer, so that the payment card account holder may associate the website with the issuer notwithstanding that the website may be operated for the issuer by the payment card association or by another party. Thus, briefly referring again to FIG. 6, there may be a considerable number of proximity payment device registration server computers 602 in the system 600, and/or the proximity payment device registration server computer 602 may host a considerable number of proximity payment device registration websites, such that a separate proximity payment device registration website may be provided for each issuer which desires proximity payment devices to be made available to its payment card account holders.

Referring again to FIG. 8, once the payment card account holder has commenced a visit to the website hosted by the proximity payment device registration server computer 602, the proximity payment device registration server computer 602 may prompt the payment card account holder to enter information for setting up the payment card account holder's account on the website, as indicated by block 804 in FIG. 8. The setup information may include, for example, a username, a PIN (personal identification number) or password for website purposes, and one or more security information questions (e.g., mother's maiden name, last 5 digits of social security number, etc.), as indicated by block.

Further, as indicated by block 806, the proximity payment device registration server computer 602 may prompt the payment card account holder to enter personal information such as the payment card account holder's day and month of birth. Next, at block 808, proximity payment device registration server computer 602 may prompt the payment card account holder to enter the PAN that identifies his/her payment card account with the issuer. Presumably, the payment card account holder is able to enter this information by referring to his/her payment card (mag stripe card) previously issued to the payment card account holder by the issuer.

In the next block, 810, the proximity payment device registration server computer 602 may prompt the payment card account holder to enter his/her billing address, and the proximity payment device registration server computer 602 may verify the billing address of the payment card account holder by using the PAN entered at block 808 to reference the account database 718 (FIG. 7).

Continuing to refer to FIG. 8, at 812 the proximity payment device registration server computer 602 may prompt the payment card account holder to enter the security code from the back of his/her payment card, and the proximity payment device registration server computer 602 may then verify the security code entered by the payment card account holder by, e.g., sending a message to the issuer to request verification of the security code.

At 814, the proximity payment device registration server computer 602 may prompt the payment card account holder to indicate how many proximity payment devices he/she wishes to receive and/or to select the type or types (e.g., keyfob, wristband and/or combined proximity payment device/mag strip card) of proximity payment device that the payment card account holder wishes to receive.

At 816 the proximity payment device registration server computer 602 generates and assigns the required number of proximity-device-only account numbers to the payment card account holder from a range of such account numbers that has previously been established by or for the issuer. Next, at 818, the proximity payment device registration server computer 602 issues one or more orders to a supplier or suppliers of proximity payment devices to load the proximity-device-only account number(s) assigned at 816 into the proximity payment device(s) selected by the payment card account holder at 814. The supplier(s) is (are) also instructed to fulfill the payment card account holder's request by mailing the proximity payment device(s) to the payment card account holder's home address.

In accordance with conventional practices, the package mailed to the payment card account holder instructs the payment card account holder to confirm receipt of the proximity payment device(s) so as to activate the assigned proximity-device-only account numbers. In accordance with aspects of the present invention, the instructions direct the payment card account holder to again visit the website hosted by the proximity payment device registration server computer 602. Thus, the process of FIG. 8 includes a decision block 820 at which the proximity payment device registration server computer 602 determines whether the payment card account holder has visited the website to confirm receipt of the proximity payment device(s). (Alternatively to confirming receipt by visiting the website, the instructions may direct or allow the user to confirm receipt via an interactive telephone voice response system.)

Once the proximity payment device registration server computer 602 determines at 820 that the payment card account holder has confirmed receipt of the proximity payment device(s), then the process of FIG. 8 advances to steps 822, 824 and 826. At step 822, the proximity payment device registration server computer 602 activates the proximity-device-only account number(s) assigned at step 816. At step 824 the proximity payment device registration server computer 602 causes the account mapping database 314 (FIG. 3) to be updated so that the now-activated proximity-device-only account number(s) is (are) associated with the payment card account holder's PAN. At step 826, the proximity payment device registration server computer 602 confirms to the payment card account holder that the proximity payment device(s) has (have) been activated.

In some embodiments, although not indicated in FIG. 8, the server computer 602 may also be accessed by account holders to report lost or stolen proximity payment devices. When the server computer 602 receives such reports, it may cause the appropriate database(s) to be updated so that the proximity-device-only account number in question is no longer listed as "active".

Reference is now made once again to the payment card transaction processing system 200 depicted in FIG. 2. In some alternative embodiments of the invention, the payment system computer (designated as block 210 in FIG. 2) may lack some of the capabilities that were described above. For example, the payment system computer may lack the capabilities for mapping proximity-device-only account numbers to PANs. In such cases, the account number mapping may be performed by the issuer host computer 212, or the entire scheme of proximity-device-only account numbers may not be implemented, and instead the account numbers stored in the proximity payment device RFID chips may be the same as the PAN for the relevant account, or may be handled in a similar manner to a PAN.

Figure 9:
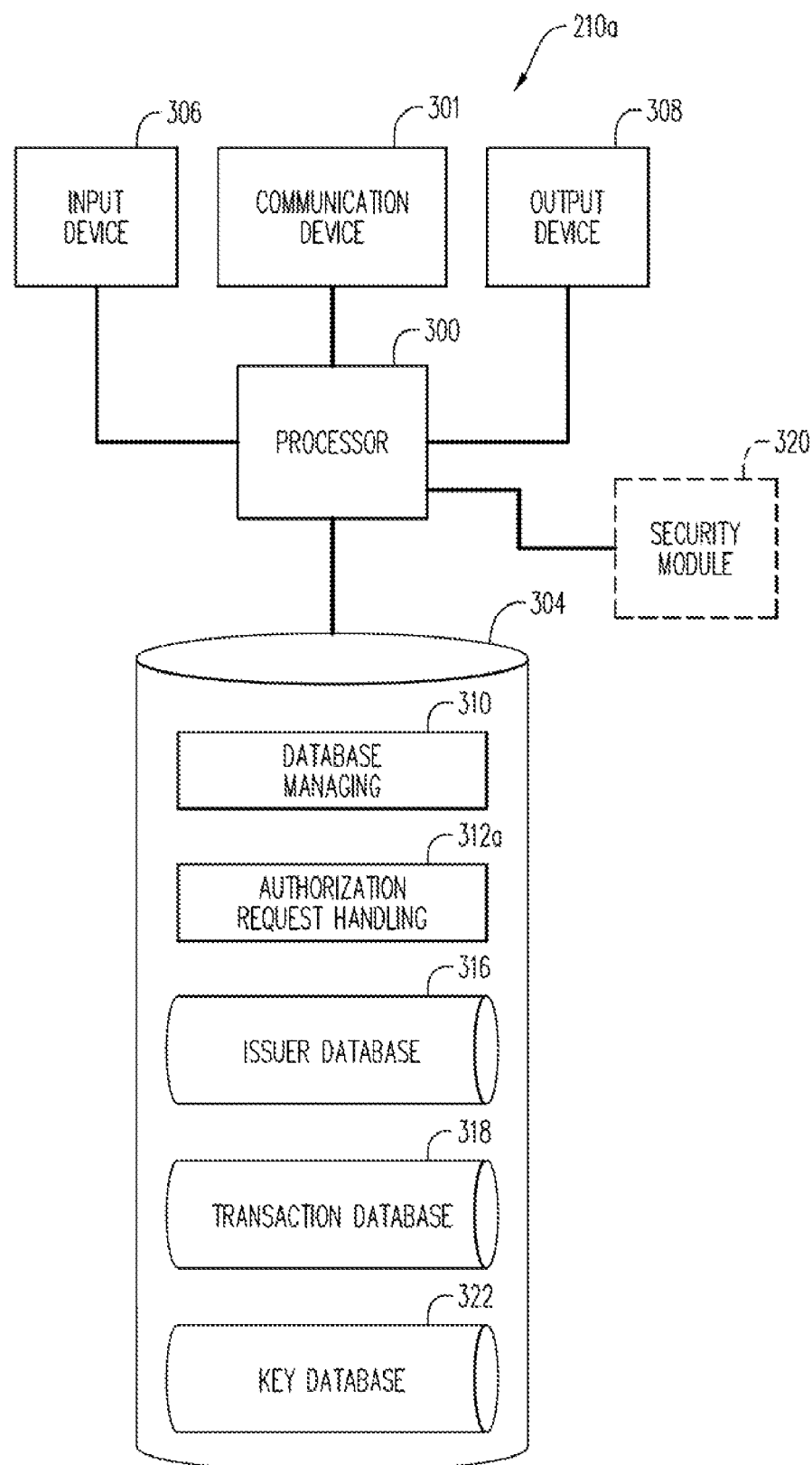
FIG. 9 is a block diagram representation of a computer system that may be operated by a payment card association in the system of FIG. 2 in connection with still other aspects of the invention.

FIG. 9 is a block diagram representation of an alternative embodiment of the payment system computer seen in FIG. 2, lacking some of the software programs and/or database(s) of the previously described embodiments, and designated generally by reference numeral 210a in FIG. 9.

As seen from FIG. 9 the payment system computer embodiment depicted therein may have all of the hardware components described above in relation to the payment system computer embodiment depicted in FIG. 3. Moreover, the software programs and databases stored in the storage device 304 in the payment system computer 210a may generally be a subset of the programs and databases of the embodiment depicted in FIG. 3. In particular, among other data, the storage device 304 may store the key database 322 referred to above. Also, the authorization request handling application program (indicated by reference numeral 312a in FIG. 9), may operate somewhat differently from the operation of the embodiment of FIG. 3, as described above in connection with FIGS. 4 and 5. Operation of the authorization request handling application program 312a as performed in the payment system computer 210a is described immediately below in conjunction with FIG. 10.

Figure 10:
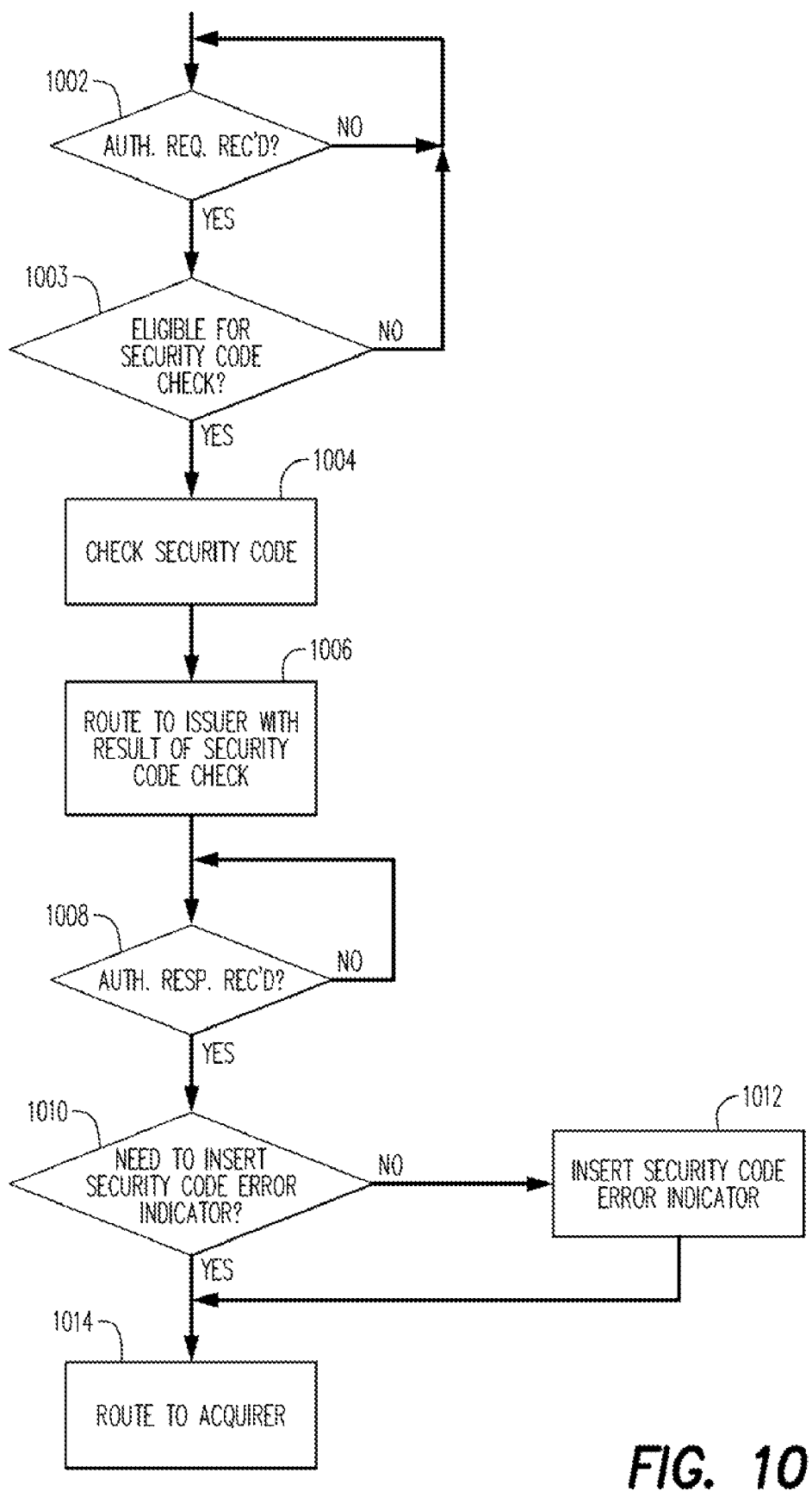
FIG. 10 is a flow chart that illustrates a process that may be performed by the computer system of FIG. 9 in accordance with aspects of the invention.

FIG. 10, then, is a flow chart that illustrates a process performed by the payment system computer 210a in accordance with aspects of the present invention.

At 1002 in FIG. 10, the process, or a particular processing thread, idles until an authorization request is received from the acquirer host computer 206. Once an authorization request has been received, processing advances to decision block 1003. At decision block 1003, it is determined whether the account number included in the authorization request falls within a range of account numbers that is eligible for the payment system computer 210a to perform a security code check. (This step may also involve checking the expiration date for the account number.) If the account number is not eligible for security code checking, the process loops back to 1002. But if the account number is eligible for security code checking, then the process advances to block 1004. At block 1004, the payment system computer 210a may check the validity of a security code that was included in the authorization request. The security code may be of one of the types described hereinabove in connection with block 414. Also the procedure used to check the security code may be in accordance with the above description of block 414. To be more explicit, the security code may be like the above-referenced "dynamic CVC3" and the procedure for checking the security code may include the known cryptographically based technique referred to hereinabove.

Continuing to refer to FIG. 10, block 1006 follows block 1004. At block 1006, the payment system computer 210a forwards the authorization request to the issuer host computer 212. As forwarded to the issuer host computer 212 by the payment system computer 210a, the authorization request may include an indication as to whether or not the security code was found to be valid by the payment system computer 210a. That indication may have been inserted in the authorization request by the payment system computer 210a.

Following block 1006 in FIG. 10 is a decision block 1008. At 1008, the process, or a particular processing thread, idles until the authorization response is received from the issuer host computer 212. Once the authorization response has been received, processing advances from 1008 to decision block 1010. At decision block 1010, the payment system computer 210a determines whether it is necessary to insert an error message in the authorization response to the effect that the security code included in the authorization request was not found to be valid. In other words, the payment system computer 210a may determine at 1010 whether the security code included in the authorization request was found at 1004 to be invalid. In some embodiments, the payment system computer 210a may make this determination by referring to data concerning the transaction that was stored in transaction database 318. Alternatively, the payment system computer 210 may make the determination based on an indication in the authorization response as received from the issuer host computer 212. That is, the authorization response as received from the issuer host computer 212 may reflect the result of the security code check, as indicated in the authorization request as sent from the payment system computer 210a to the issuer host computer 212.

If a positive determination is made at 1010 (i.e., if the payment system computer 210a determines that it is necessary to insert an error message), then, as indicated at 1012, the payment system computer 210a inserts into the authorization response the error message to indicate invalidity of the security code.

Step 1014 follows step 1012. At step 1014, the payment system computer 210a routes the authorization response to the acquirer host computer 206 with the error message present in the authorization response. Alternatively, if a negative determination is made at 1012, then step 1014 may directly follow 1010, such that the payment system computer 210a routes the authorization response to the acquirer host computer 206 without the error message being included in the authorization response.

In an alternative embodiment of the process of FIG. 10, the payment system computer 210a declines transactions that fail the security code check without forwarding them to the issuer; in this embodiment the payment system computer 210a only forwards to the issuer transactions that pass the security code check, and sends an advice message to the issuer with respect to each declined transaction.

Figure 11:
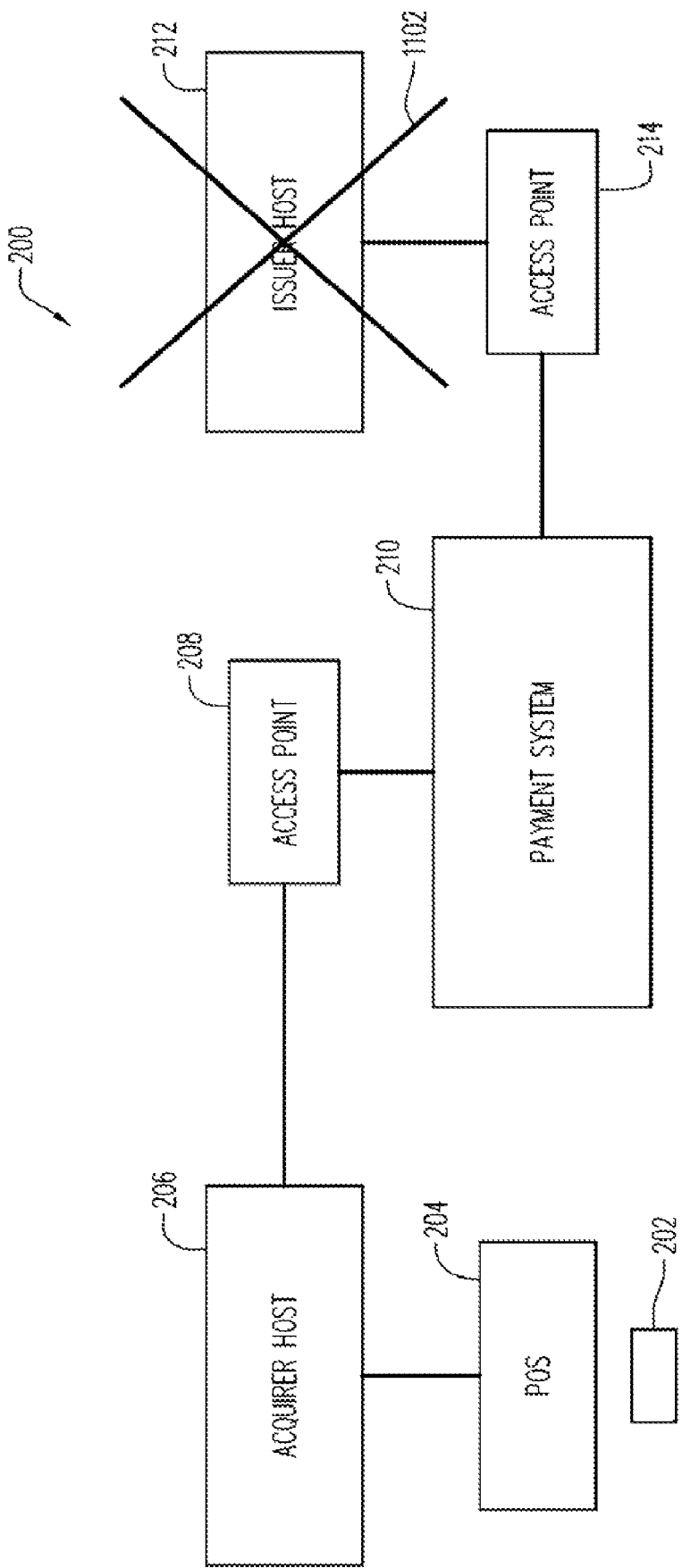
FIG. 11 is a block diagram representation of a payment card transaction processing system, schematically representing a circumstance when a card issuer's host computer is not available to handle transactions.

FIG. 11 is similar to FIG. 2, and again represents the payment card transaction processing system 200 while also schematically representing a circumstance when the issuer host computer 212 is not available to handle transactions, as indicated by the "X" mark 1102. Such a situation is known to those who are skilled in the art, and it is further known that in such a situation, the payment system computer 210 may be programmed to "stand in" for the issuer host computer 212 by handling authorization requests in accordance with rules that the issuer has established. In accordance with aspects of the present invention, the payment system computer 210a (FIG. 9) is present in the payment card transaction processing system and "stands in" for the issuer host computer 212 when necessary, while also providing functions relative to checking the validity of security codes included in the authorization requests.

Figure 12:
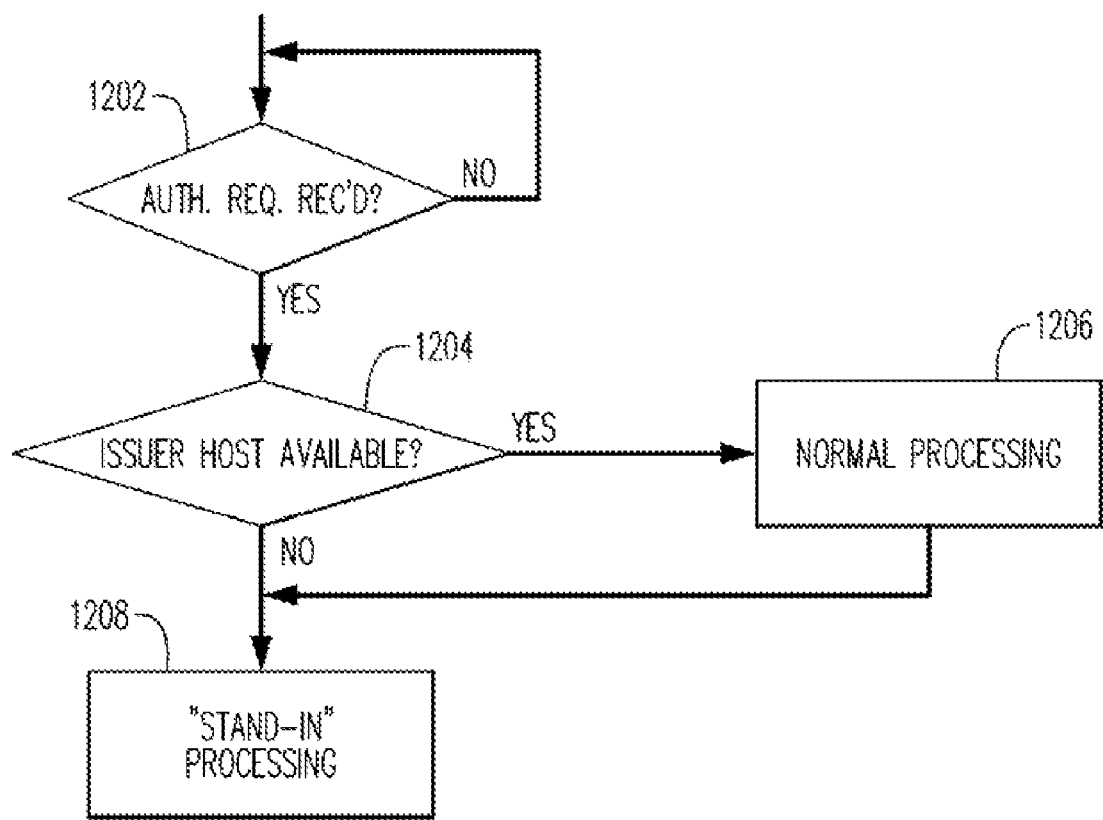
FIG. 12 is a flow chart that illustrates a process that may be performed in accordance with aspects of the invention by a computer system operated by a payment card association in connection with the system of FIG. 1.
Figure 13:
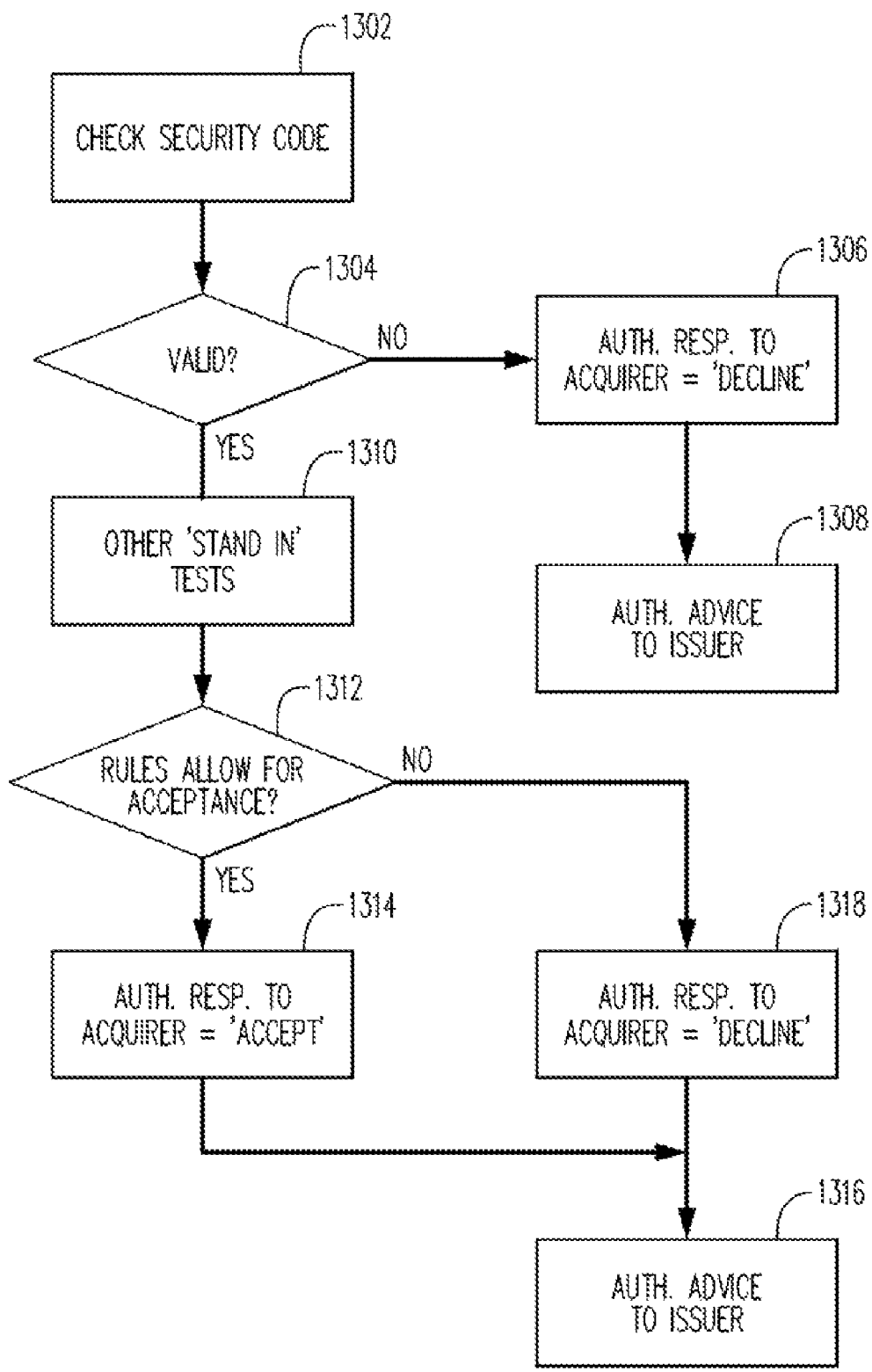
FIG. 13 is a flow chart that illustrates certain details of the process of FIG. 12.

FIG. 12 is a flow chart that illustrates a process that may be performed in accordance with aspects of the invention by the payment system computer 210a, and FIG. 13 is a flow chart that illustrates certain details of the process of FIG. 12.

The process of FIG. 12 (or a particular processing thread) idles at 1202 until an authorization request is received from the acquirer host computer 206. Once an authorization request has been received, processing advances to decision block 1204. At decision block 1204, the payment system computer 210a determines whether the issuer host computer 212 (i.e., the particular issuer that issued the payment card account to be accessed by the authorization request) is available to handle transactions. (As is known, issuer host computers may occasionally be unavailable because of scheduled maintenance, installations of replacement hardware or software, or for other reasons.) If the payment system computer 210a determines at 1204 that the relevant issuer host computer 212 is available, then the payment system computer 210a proceeds, as indicated at 1206, to handle the authorization request in a normal fashion (e.g., as illustrated in FIG. 10).

If the payment system computer 210a determines at 1204 that the relevant issuer host computer 212 is not available, then block 1208 follows decision block 1204. In block 1208 the payment system computer 210a enters and operates in a "stand in" processing mode. Details of the stand in processing mode are illustrated in FIG. 13.

Referring, then, to FIG. 13, at 1302, the payment system computer 210a may check the validity of a security code that was included in the authorization request if, by prior arrangement with the issuer, the issuer had requested that the payment system computer do so. The security code may be of one of the types described hereinabove in connection with block 414. (This step may also entail checking the expiration date for the account number.) Also the procedure used to check the security code may be in accordance with the above description of block 414. To be more explicit, the security code may be like the above-referenced "dynamic CVC3" and the procedure for checking the security code may include the known cryptographically based technique referred to hereinabove.

Continuing to refer to FIG. 13, a decision block 1304 follows 1302. At 1304, the payment system computer 210a determines whether the security code check performed at 1302 indicated that the security code was valid. If not, block 1306 follows decision block 1304. At 1306, the payment system computer 210a transmits an authorization response to the acquirer host computer 206 with an indication that the authorization request is declined. Next, at 1308, the payment system computer 210a transmits to the issuer host computer 212 (or stores for later transmission to the issuer host computer 212) an authorization advice message to indicate (a) that the payment system computer 210a received the authorization request, (b) that the payment system computer 210a declined the authorization request, and (c) that the security code failed the check.

Referring again to decision block 1304, if it is determined that the security code is valid, then block 1310 follows 1304. At 1310, the payment system computer 210a performs tests on the transaction such as are conventionally performed in the 'stand in' role.

Decision block 1312 follows 1310. At decision block 1312, the payment system computer 210a determines, based on results of the tests performed at 1310, whether the authorization request should be accepted. If so, then block 1314 follows 1312. At 1314, the payment system computer 210a transmits an authorization response to the acquirer host computer 206 with an indication that the authorization request is approved. Block 1316 then follows, at which the payment system computer 210a transmits to the issuer host computer 212 (or stores for later transmission to the issuer host computer 212) an authorization advice message to indicate (a) that the payment system computer 210a received the authorization request, and (b) how the payment system computer 210a responded on the issuer's behalf.

Referring again to decision block 1312, if a negative determination is made (i.e., if the tests indicate that the authorization request should be declined), then block 1318 follows 1312. At 1318, the payment system computer 210a transmits an authorization response to the acquirer host computer 206 with an indication that the authorization request is declined. Block 1316 then follows, at which the payment system computer 210a transmits to the issuer host computer 212 (or stores for later transmission to the issuer host computer 212) an authorization advice message to indicate (a) that the payment system computer 210a received the authorization request, and (b) how the payment system computer 210a responded on the issuer's behalf.

In the embodiment depicted in FIGS. 4 and 5, the payment system computer checks as to whether the transaction is a proximity-read transaction, and translates the proximity-device-only account number to the PAN with which the proximity-device-only account number is associated. However, in other embodiments, these functions may be performed by the issuer host computer.

In some embodiments, the payment system computer 210 may receive an authorization request and perform the function of mapping a proximity-device-only account number to a PAN, and may perform the cryptographic security code check as described above in connection with FIG. 4, and then may determine that the issuer host computer 212 is not available. At that point, the payment system computer 210 may enter a 'stand in' mode of operation, like that of FIG. 13, and may use the result of the security code check in deciding whether to approve or decline the authorization request on behalf of the issuer.

Whenever, in the above description or in the appended claims, reference is made to transmitting a message to an issuer host computer, it should be understood that this includes transmitting a message to a computer operated by a service provider on behalf of the issuer. Similarly, receiving a message from an issuer host computer includes receiving a message from a computer operated by a service provider on behalf of the issuer. Further, transmitting a message to an acquirer host computer includes transmitting a message to a computer operated by a service provider on behalf of the acquirer, and receiving a message from an acquirer host computer includes receiving a message from a computer operated by a service provider on behalf of the acquirer.

As used herein and in the appended claims, "proximity reading" refers to an activity, engaged in by a proximity reader that is part of or associated with a point of sale terminal or similar device, in which the proximity reader receives an account number from a proximity payment device by wireless communication.

Among other possible alternative embodiments of the invention, the process illustrated in FIG. 4 could be modified by omitting at least some of the checks indicated in FIG. 4, although it is preferable that the check indicated at 408 not be omitted. In some embodiments, the order in which the checks are performed may be different from the order indicated in FIG. 4.

The flow charts and descriptions thereof herein should not be understood to prescribe a fixed order of performing the method steps described therein. Rather, the method steps may be performed in any order that is practicable.

As used herein and in the appended claims, the term "payment card account" includes a credit card account or a deposit account that the account holder may access using a debit card. The term "payment card account number" includes a number that identifies a payment card account or a number carried by a payment card, or a number that is used to route a transaction in a payment system that handles debit card and/or credit card transactions. The term "payment card" includes a credit card or a debit card.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:

receiving, in a computer, an authorization request for a purchase transaction;

determining in the computer whether the purchase transaction included a proximity-reading operation;

in response to the computer determining that the purchase transaction included said proximity-reading operation, the computer mapping a first account number included in the authorization request into a second account number associated with the first account number;

in response to the computer determining that the purchase transaction did not include said proximity-reading operation, the computer declining the authorization request;

the computer receiving an authorization response from an issuer financial institution, the authorization response including the second account number; and the computer responding to the authorization response by determining whether to map the second account number into the first account number;

wherein the computer determines whether to map the second account number into the first account number based on a code or flag in the authorization response.

2. The method of claim 1, further comprising:

in response to the computer mapping the first account number into the second account number, referencing a payment card account identified by said second account number to determine whether to approve the authorization request.

3. The method of claim 2, wherein:

said proximity reading operation includes proximity-reading a proximity payment device said proximity payment device is associated with said payment card account; and said first account number is assigned to said proximity payment device.

4. The method of claim 1, wherein the second account number is a primary account number that identifies a payment card account.

5. The method of claim 4, wherein:

said proximity reading operation includes proximity-reading a proximity payment device;

said proximity payment device is associated with said payment card account; and said first account number is assigned to said proximity payment device.

6. The method of claim 1, further comprising:

prior to said step of receiving said authorization response, transmitting the authorization request to the issuer financial institution with the second account number substituted for the first account number in the authorization request.

7. The method of claim 1, further comprising:

the computer mapping the second account number into the first account number.

8. The method of claim 7, wherein the computer accesses a transaction database to map the second account number into the first account number.

9. The method of claim 7, wherein the computer accesses an account mapping database to map the second account number into the first account number.

10. The method of claim 7, further comprising:

the computer routing the authorization response to an acquirer financial institution with the first account number included in the authorization response.

\* \* \* \* \*